United States Patent
Yu et al.

(10) Patent No.: US 7,471,088 B2
(45) Date of Patent: *Dec. 30, 2008

(54) ELIMINATION OF THE ANISOTROPY EFFECT IN LWD AZIMUTHAL RESISTIVITY TOOL DATA

(75) Inventors: Liming Yu, Stafford, TX (US); Tsili Wang, Katy, TX (US); Jack Signorelli, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 103 days.

This patent is subject to a terminal disclaimer.

(21) Appl. No.: 11/298,255

(22) Filed: Dec. 9, 2005

(65) Prior Publication Data

US 2006/0255810 A1    Nov. 16, 2006

Related U.S. Application Data

(60) Provisional application No. 60/635,533, filed on Dec. 13, 2004.

(51) Int. Cl.
*G01V 3/18* (2006.01)
(52) U.S. Cl. .............. 324/339; 324/343; 702/7
(58) Field of Classification Search ........ 324/339, 324/333, 338, 340, 341, 342, 343, 346, 351, 324/355, 356, 368, 369; 702/7
See application file for complete search history.

(56) References Cited

U.S. PATENT DOCUMENTS

| RE35,386 | E | 12/1996 | Wu et al. | |
| 5,736,860 | A * | 4/1998 | Chaillout et al. | 324/339 |
| 5,999,883 | A * | 12/1999 | Gupta et al. | 702/7 |
| 6,061,633 | A * | 5/2000 | Fukuhara et al. | 702/6 |
| 6,181,138 | B1 * | 1/2001 | Hagiwara et al. | 324/338 |
| 6,308,136 | B1 | 10/2001 | Tabarovsky et al. | |
| 2003/0229449 | A1 | 12/2003 | Merchant et al. | |
| 2004/0017197 | A1 * | 1/2004 | Chen et al. | 324/339 |
| 2004/0196047 | A1 * | 10/2004 | Fanini et al. | 324/339 |
| 2005/0140373 | A1 * | 6/2005 | Li et al. | 324/338 |
| 2006/0186888 | A1 * | 8/2006 | Wang et al. | 324/338 |

FOREIGN PATENT DOCUMENTS

EP    0715188 A2    6/1996

* cited by examiner

*Primary Examiner*—Reena Aurora
*Assistant Examiner*—David M. Schindler
(74) *Attorney, Agent, or Firm*—Madan, Mossman & Sriram, P.C.

(57) ABSTRACT

Cross-component measurements made with a dual-transmitter configuration are processed to estimate a distance to an interface in an anisotropic earth formation. Optionally, measurements may be made with two receivers, also in the dual transmitter configuration.

21 Claims, 12 Drawing Sheets

ELIMINATION OF THE ANISOTROPY EFFECT IN LWD AZIMUTHAL RESISTIVITY TOOL DATA

CROSS REFERENCES TO RELATED APPLICATIONS

This application claims priority from U.S. Provisional Patent Application Ser. No. 60/635,533 filed on Dec. 13, 2004

BACKGROUND OF THE INVENTION

1. Field of the Invention

This invention relates generally to drilling of lateral wells into earth formations, and more particularly to the maintaining the wells in a desired position relative to an interface within a reservoir in situations where the earth formations are anisotropic.

2. Description of the Related Art

To obtain hydrocarbons such as oil and gas, well boreholes are drilled by rotating a drill bit attached at a drill string end. The drill string may be a jointed rotatable pipe or a coiled tube. Boreholes may be drilled vertically, but directional drilling systems are often used for drilling boreholes deviated from vertical and/or horizontal boreholes to increase the hydrocarbon production. Modern directional drilling systems generally employ a drill string having a bottomhole assembly (BHA) and a drill bit at an end thereof that is rotated by a drill motor (mud motor) and/or the drill string. A number of downhole devices placed in close proximity to the drill bit measure certain downhole operating parameters associated with the drill string. Such devices typically include sensors for measuring downhole temperature and pressure, tool azimuth, tool inclination. Also used are measuring devices such as a resistivity-measuring device to determine the presence of hydrocarbons and water. Additional downhole instruments, known as measurement-while-drilling (MWD) or logging-while-drilling (LWD) tools, are frequently attached to the drill string to determine formation geology and formation fluid conditions during the drilling operations.

Boreholes are usually drilled along predetermined paths and proceed through various formations. A drilling operator typically controls the surface-controlled drilling parameters during drilling operations. These parameters include weight on bit, drilling fluid flow through the drill pipe, drill string rotational speed (r.p.m. of the surface motor coupled to the drill pipe) and the density and viscosity of the drilling fluid. The downhole operating conditions continually change and the operator must react to such changes and adjust the surface-controlled parameters to properly control the drilling operations. For drilling a borehole in a virgin region, the operator typically relies on seismic survey plots, which provide a macro picture of the subsurface formations and a pre-planned borehole path. For drilling multiple boreholes in the same formation, the operator may also have information about the previously drilled boreholes in the same formation.

In development of reservoirs, it is common to drill boreholes at a specified distance from fluid contacts within the reservoir. An example of this is shown in FIG. 2 where a porous formation denoted by 105a, 105b has an oil water contact denoted by 113. The porous formation is typically capped by a caprock such as 103 that is impermeable and may further have a non-porous interval denoted by 109 underneath. The oil-water contact is denoted by 113 with oil above the contact and water below the contact: this relative positioning occurs due to the fact the oil has a lower density than water. In reality, there may not be a sharp demarcation defining the oil-water contact; instead, there may be a transition zone with a change from high oil-saturation at the top to high water-saturation at the bottom. In other situations, it may be desirable to maintain a desired spacing from a gas-oil. This is depicted by 114 in FIG. 2. It should also be noted that a boundary such as 114 could, in other situations, be a gas-water contact.

In order to maximize the amount of recovered oil from such a borehole, the boreholes are commonly drilled in a substantially horizontal orientation in close proximity to the oil water contact, but still within the oil zone. U.S. Pat. No. RE35,386 to Wu et al, having the same assignee as the present application and the contents of which are fully incorporated herein by reference, teaches a method for detecting and sensing boundaries in a formation during directional drilling so that the drilling operation can be adjusted to maintain the drillstring within a selected stratum is presented. The method comprises the initial drilling of an offset well from which resistivity of the formation with depth is determined. This resistivity information is then modeled to provide a modeled log indicative of the response of a resistivity tool within a selected stratum in a substantially horizontal direction. A directional (e.g., horizontal) well 115 is thereafter drilled wherein resistivity is logged in real time and compared to that of the modeled horizontal resistivity to determine the location of the drill string 121 and thereby the borehole in the substantially horizontal stratum. From this, the direction of drilling can be corrected or adjusted so that the borehole is maintained within the desired stratum. The resistivity sensor typically comprises a transmitter and a plurality of sensors. Measurements may be made with propagation sensors that operate in the 400 kHz and higher frequency.

A limitation of the method and apparatus used by Wu is that resistivity sensors are responsive to oil/water contacts for relatively small distances, typically no more than 5 m; at larger distances, conventional propagation tools are not responsive to the resistivity contrast between water and oil. One solution that can be used in such a case is to use an induction logging that typically operate in frequencies between 10 kHz and 50 kHz. U.S. Pat. No. 6,308,136 to Tabarovsky et al having the same assignee as the present application and the contents of which are fully incorporated herein by reference, teaches a method of interpretation of induction logs in near horizontal boreholes and determining distances to boundaries in proximity to the borehole.

An alternative approach to determination of distances to bed boundaries is disclosed in U.S. patent application Ser. No. 10/373,365 of Merchant et al. Taught therein is the use of multicomponent induction logging tools and measurements as an indicator of a distance to a bed boundary and altering the drilling direction based on such measurements. In conventional induction logging tools, the transmitter and receiver antenna coils have axes substantially parallel to the tool axis (and the borehole). The antenna configuration of the multicomponent tool of Merchant et al. is illustrated in FIG. 3.

FIG. 3 (prior art) shows the configuration of transmitter and receiver coils in the 3DExplorer™ (3DEX) induction logging instrument of Baker Hughes. Three orthogonal transmitters 201, 203, and 205 that are referred to as the $T_x$, $T_z$, and $T_y$ transmitters are placed in the order shown. The three transmitters induce magnetic fields in three spatial directions. The subscripts (x, y, z) indicate an orthogonal system substantially defined by the directions of the normal to the coils of the transmitters. The z-axis is chosen to be along the longitudinal axis of the tool, while the x-axis and y-axis are mutually perpendicular directions lying in the plane transverse to the axis. Corresponding to each transmitter 201, 203, and 205 are associated receivers 207, 209, and 211, referred to as the $R_x$, $R_z$, and $R_y$ receivers, aligned along the orthogonal system defined by the transmitter normals, placed in the order shown in FIG. 1. $R_x$, $R_z$, and $R_y$ are responsible for measuring the corresponding magnetic fields $H_{xx}$, $H_{zz}$, and $H_{yy}$. Within this system for naming the magnetic fields, the first index indicates the direction of the transmitter and the second index indicates the direction of the receiver. In addition, the receivers $R_y$ and $R_z$, measure two cross-components, $H_{xy}$ and $H_{xz}$ of the magnetic field produced by the $T_x$ transmitter (201). This embodiment of the invention is operable in single frequency or multiple frequency modes. It should further be noted that the description herein with the orthogonal coils and one of the axes parallel to the tool axis is for illustrative purposes only. Additional components could be measured, and, in particular, the coils could be inclined at an angle other than 0° or 90° to the tool axis, and furthermore, need not be orthogonal; as long as the measurements can be "rotated" or "projected" onto three orthogonal axes, the methodology described herein is applicable. Measurements may also be made at a plurality of frequencies, and/or at a plurality of transmitter-receiver distances.

While the teachings of Merchant are show that the 3DEX™ measurements are very useful in determination of distances to bed boundaries (and in reservoir navigation), Merchant discusses the reservoir navigation problem in terms of measurements made with the borehole in a substantially horizontal configuration (parallel to the bed boundary). This may not always be the case in field applications where the borehole is approaching the bed boundary at an angle. In a situation where the borehole is inclined, then the multicomponent measurements, particularly the cross-component measurements, are responsive to both the distance to the bed boundary and to the anisotropy in the formation.

It would be desirable to have a method of determination of distance to a bed boundary in a deviated well in anisotropic earth formations. The present invention satisfies this need.

SUMMARY OF THE INVENTION

One embodiment of the present invention is a method of evaluating an anisotropic earth formation having an interface. Measurements are made with at least one receiver on an instrument conveyed in a borehole in the earth formation corresponding to excitation from opposite sides of the receiver. A distance to an interface in the earth formation is determined from principal cross-component measurements resulting from excitation in the opposite directions. The interface may be a bed boundary or it may be a fluid contact. The principal cross components may be zx measurements. The resistivity measuring instrument may be an induction instrument. The principal cross component measurements may be direct measurements or measurements obtained by coordinate rotation. Two receivers may be used, in which case a weighted difference of measurements made by the two receivers may be used. Estimating the distance may be based on at least one of (i) s difference of in-phase components of the principal cross components, and, (ii) a difference of quadrature components of the principal cross components.

The instrument may be conveyed downhole on a wireline or be part of a bottomhole assembly (BHA). In the latter case, the determined distance may be used in controlling the drilling direction and in reservoir navigation to maintain a desired distance of the BHA from the interface.

Another embodiment of the present invention is an apparatus for evaluating an anisotropic earth formation having an interface. Measurements are made with a pair of transmitters positioned on opposite sides of at least one receiver on an instrument conveyed in a borehole in the earth formation. The measurements may be principal component measurements or they may be rotated to give principal component measurements. A processor determines from the principal component measurements a distance to an interface in the earth formation. The interface may be a bed boundary or it may be a fluid contact. The principal cross components may be zx measurements. The resistivity measuring instrument may be an induction instrument. Two receivers may be used, in which case a weighted difference of measurements made by the two receivers may be used. The processor may estimate the distance using at least one of (i) a difference in-phase components of the principal cross components, and (ii) a difference in quadrature components of the principal cross components.

The instrument may be conveyed downhole on a wireline or be part of a bottomhole assembly (BHA). In the latter case, the determined distance may be used by a downhole processor for controlling the drilling direction and in reservoir navigation to maintain a desired distance of the BHA from the interface.

Another embodiment of the invention is a machine readable medium that includes instructions for a method of evaluating an anisotropic earth formation having an interface. Based on the instructions, measurements made with at least one receiver on an instrument conveyed in a borehole in the earth formation corresponding to excitation from opposite sides of the receiver are processed to determine a distance to an interface in the earth formation. The instrument may be conveyed downhole on a wireline or be part of a bottomhole assembly (BHA). In the latter case, the instructions may enable use of the determined distance for controlling the drilling direction and/or maintaining a desired distance of the BHA from the interface. The machine readable medium may include ROMs, EAROMs, EPROMs, EEPROMs, flash memories and optical disks.

BRIEF DESCRIPTION OF THE DRAWINGS

For detailed understanding of the present invention, reference should be made to the following detailed description of the preferred embodiment, taken is conjunction with the accompanying drawings, in which like elements have been given like numerals and wherein.

DETAILED DESCRIPTION OF THE INVENTION

Figure 1:
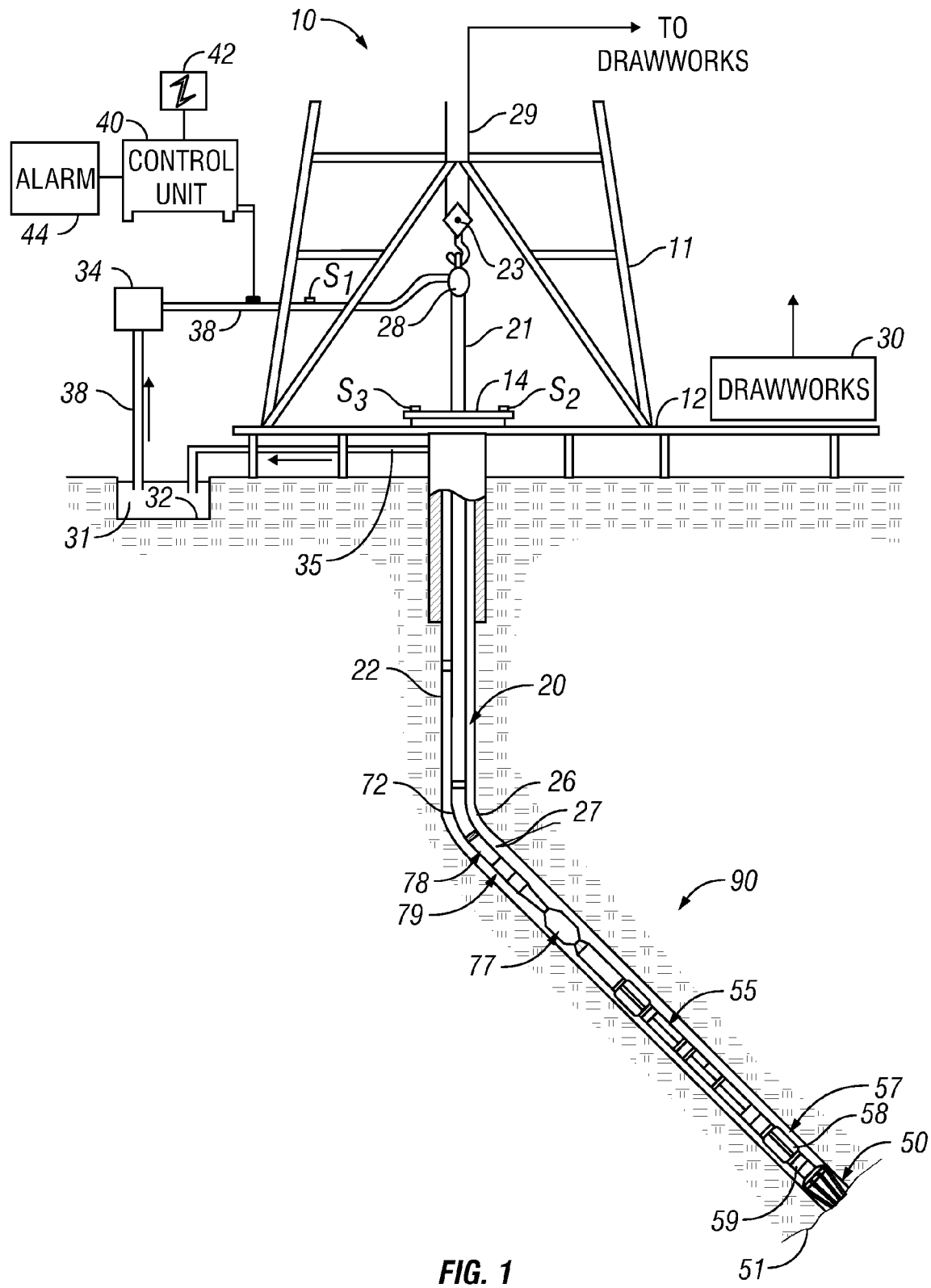
FIG. 1 (prior art) shows a schematic diagram of a drilling system having a drill string that includes a sensor system according to the present invention.
Figure 2:
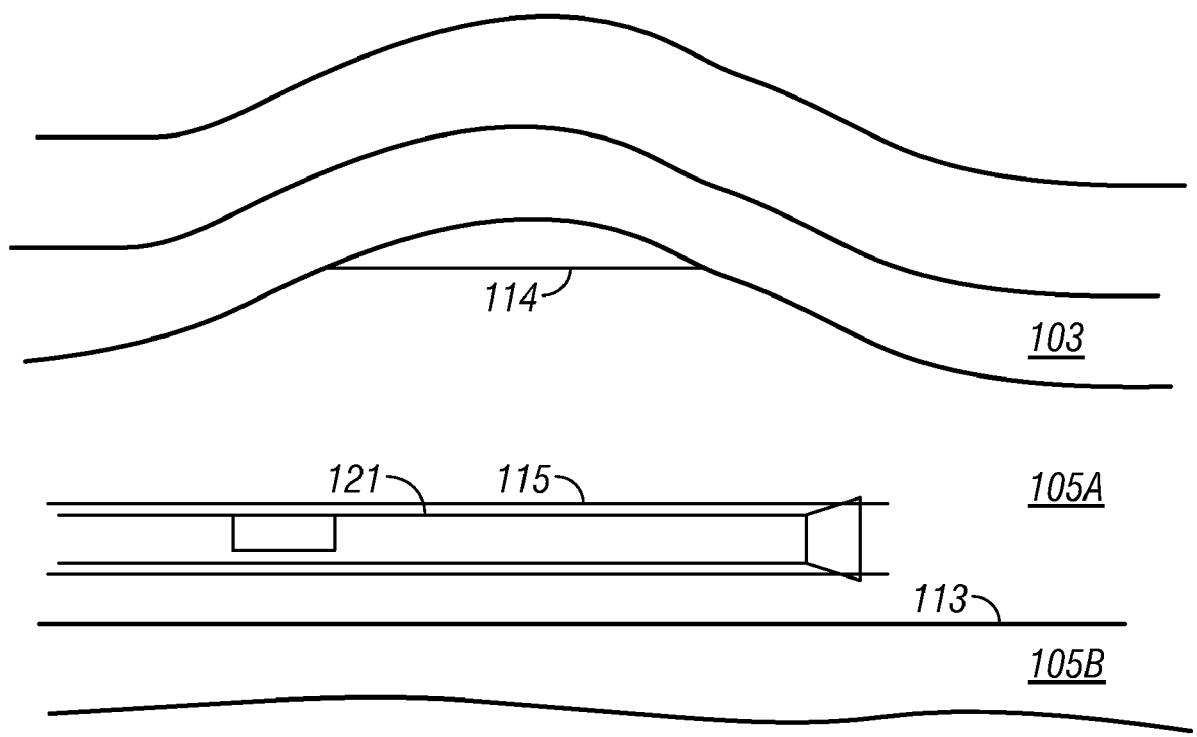
FIG. 2 is an illustration of a substantially horizontal borehole proximate to an oil/water contact in a reservoir.

FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 38 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ typically placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the invention, the drilling bit 59 is rotated by only rotating the drill pipe 22. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In an exemplary embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the invention, a drilling sensor module 59 is placed near the drill bit 50. The drilling sensor module contains sensors, circuitry and processing software and algorithms relating to the dynamic drilling parameters. Such parameters typically include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the communication sub 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 typically includes a computer or a microprocessor-based processing system, memory for storing programs or models and data, a recorder for recording data, and other peripherals. The control unit 40 is typically adapted to activate alarms 44 when certain unsafe or undesirable operating conditions occur.

Figure 3:
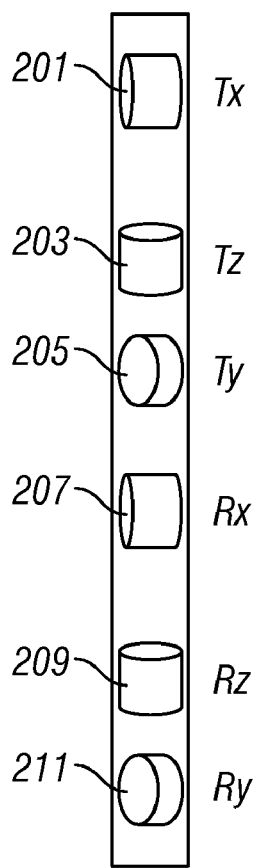
FIG. 3 (prior art) illustrates the 3DEX™ multi-component induction tool of Baker Hughes Incorporated.
Figure 4:
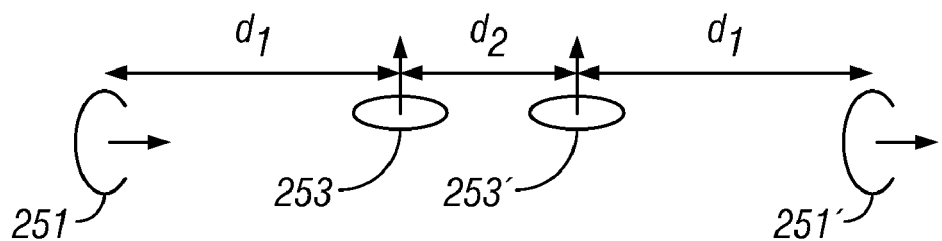
FIG. 4 illustrates the transmitter and receiver configuration of the AZMRES tool suitable for use with the method of the present invention.

FIG. 4 shows an azimuthal resistivity tool configuration suitable for use with the method of the present invention. This is a modification of the basic 3DEX tool of FIG. 3 and comprises two transmitters 251, 251' whose dipole moments are parallel to the tool axis direction and two receivers 253, 253' that are perpendicular to the transmitter direction. In one embodiment of the invention, the tool operates at 400 kHz frequency. When the first transmitter fires, the two receivers measure the magnetic field produced by the induced current in the formation. This is repeated for, the second transmitter. The signals are combined in following way:

$$H_{T1}=H_2-(d_1/(d_1+d_2))^3 \cdot H_1$$

$$H_{T2}=H_1-(d_1/(d_1+d_2))^3 \cdot H_2 \qquad (1).$$

Here, $H_1$ and $H_2$ are the measurements from the first and second receivers, respectively, and the distances $d_1$ and $d_2$ are as indicated in FIG. 4. The tool rotates with the BHA and in an exemplary mode of operation, makes measurements at 16 angular orientations 22.5° apart. The measurement point is at the center of two receivers. In a uniform, isotropic formation, no signal would be detected at either of the two receivers. The invention thus makes use of cross component measurements, called principal cross-components, obtained from a pair of transmitters disposed on either side of at least one receiver. It should further be noted that using well known rotation of coordinates, the method of the present invention also works with various combinations of measurements as long as they (i) correspond to signals generated from opposite sides of a receiver, and, (ii) can be rotated to give the principal cross components.

The dual transmitter configuration was originally developed to reduce electronic errors in the instrument and to increase the signal to noise ratio. See U.S. Pat. No. 6,586,939 to Fanini et al. The present invention is an application of the dual transmitter configuration for a new application.

Figure 5A:
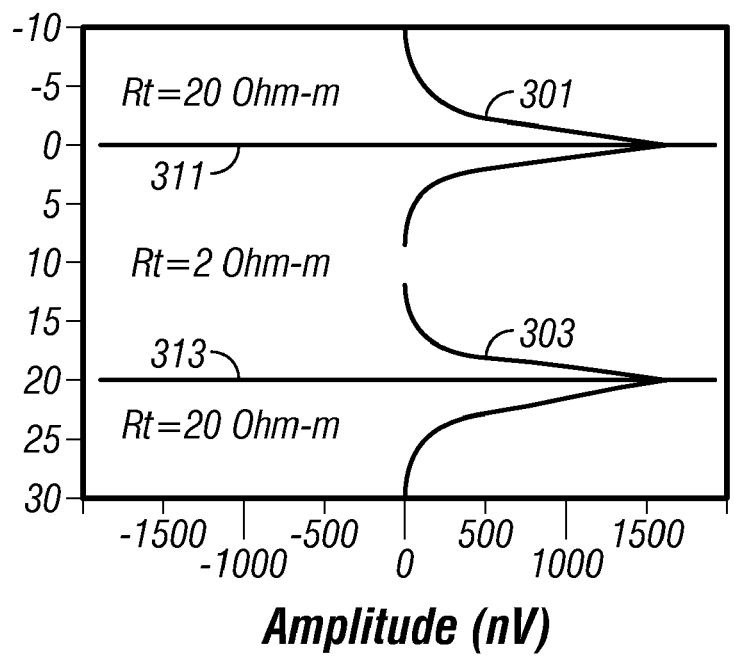
FIGS. 5A, 5B show exemplary responses to a model in which a layer of resistivity 2 Ω-m is positioned between two layers of resistivity 20 Ω-m.
Figure 5B:
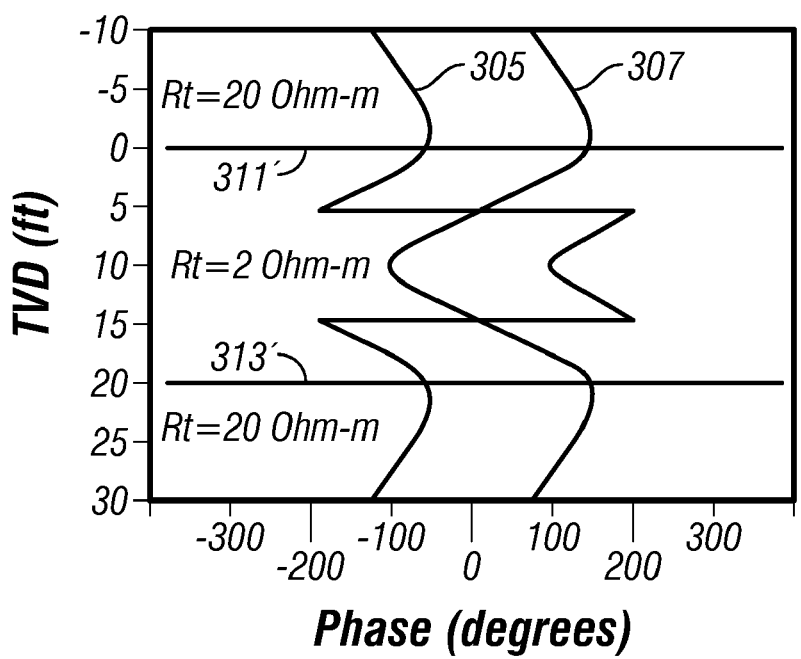
Figure 5C:
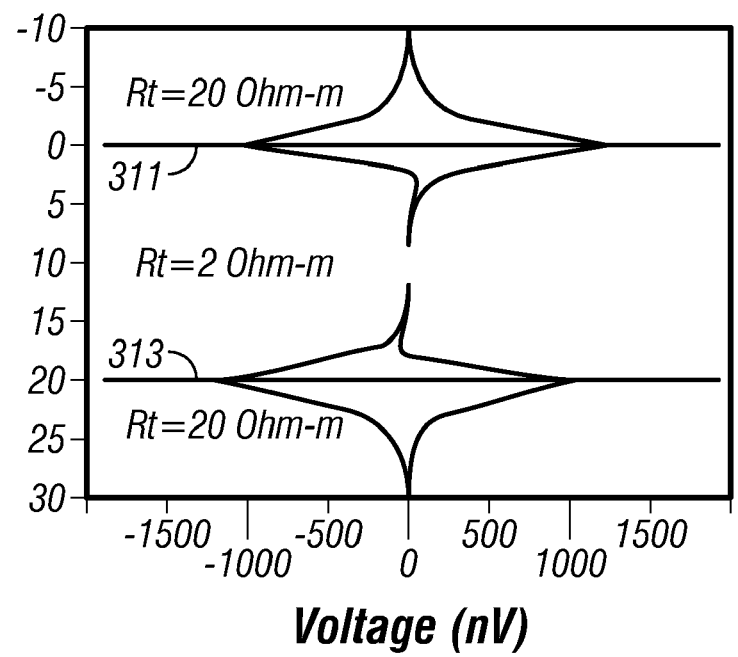
FIGS. 5C, 5D show the in-phase and quadrature component response for two transmitters positioned on opposite sides of a receiver.
Figure 5D:
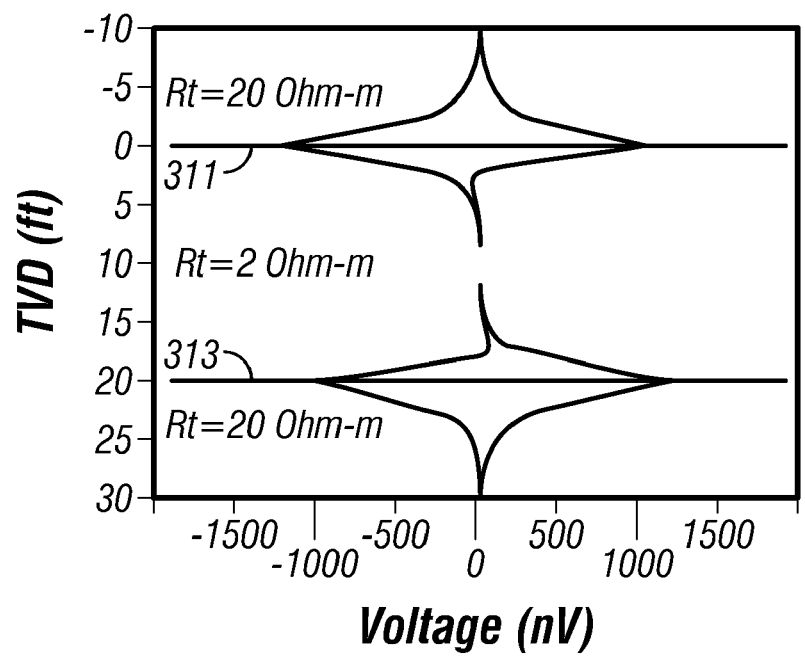

FIGS. 5a, 5b show exemplary responses to a model in which a layer of resistivity 2 Ω-m is positioned between two layers of resistivity 20 Ω-m. The bed boundaries are 20 ft (6.096 m) apart and are indicated by 311, 313 in FIG. 5a and by 311', 313' in FIG. 5b. 301, 303 are the amplitudes of the $T_1$ and $T_2$ responses (given by eqn. 1) when the receivers are oriented vertically, while 305, 307 are the phases of the $T_1$ and $T_2$ responses. Again, it should be emphasized that the responses correspond to measurements made with the tool parallel to the bed boundaries. This is consistent with the results of Merchant (which were for a single transverse receiver). FIGS. 5c gives the in-phase and quadrature components of $T_1$ and FIG. 5d gives the in-phase and quadrature components of the $T_2$ response.

Figure 6A:
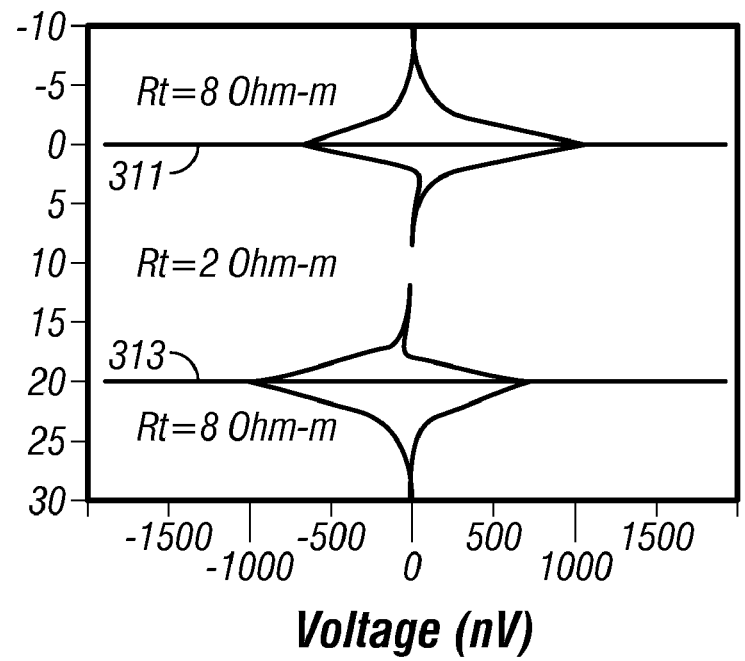
FIGS. 6A, 6B show the effect of anisotropy on a single transmitter response in a horizontal borehole.
Figure 6B:
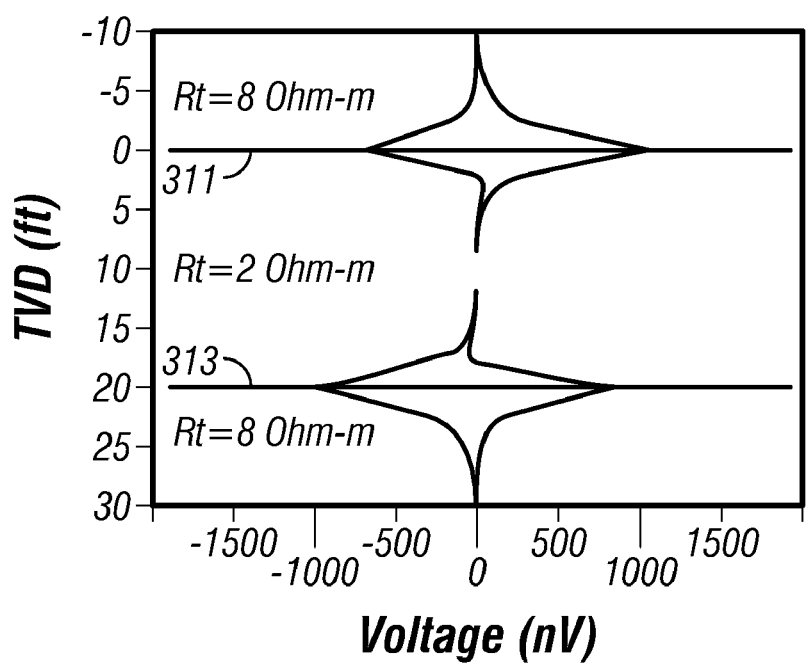

Turning now to FIG. 6a, the in-phase and quadrature components of the $T_1$ response are shown for a horizontal borehole at different distances from the bed boundaries. The model has a 2 Ω-m layer between two layers of 8 Ω-m vertical resistivity. For FIG. 6a, the layers are isotropic, i.e., the vertical resistivity is the same as the horizontal resistivity. FIG. 6b shows the in-phase and quadrature components of the $T_1$ response are shown for a horizontal borehole at different distances from the bed boundaries for a model with an anisotropy factor of 4.0, i.e, the vertical resistivity is four times the horizontal resistivity. Comparison of FIGS. 6a and 6b shows that the responses are unaffected by the vertical resistivity and depend only on the horizontal resistivity.

Figure 7A:
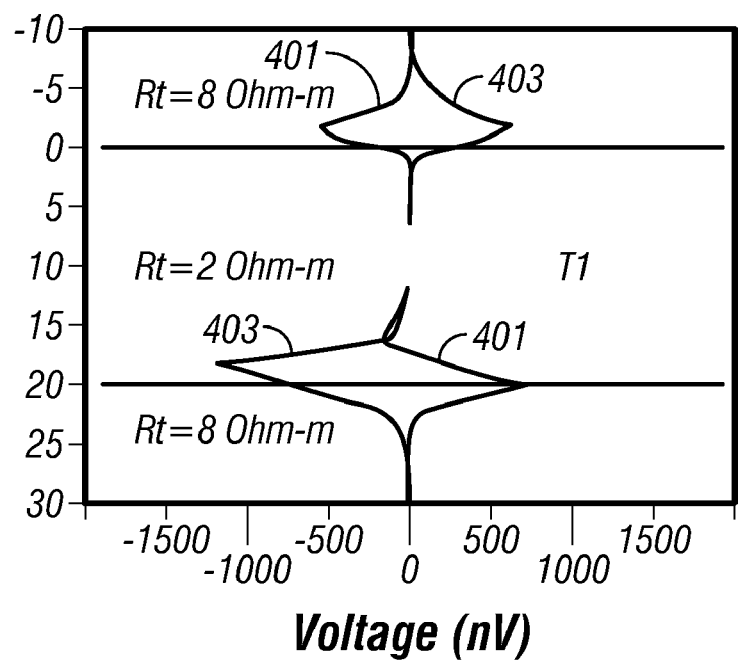
FIGS. 7A, 7B show the effect of anisotropy on a single transmitter response in a deviated borehole.
Figure 7B:
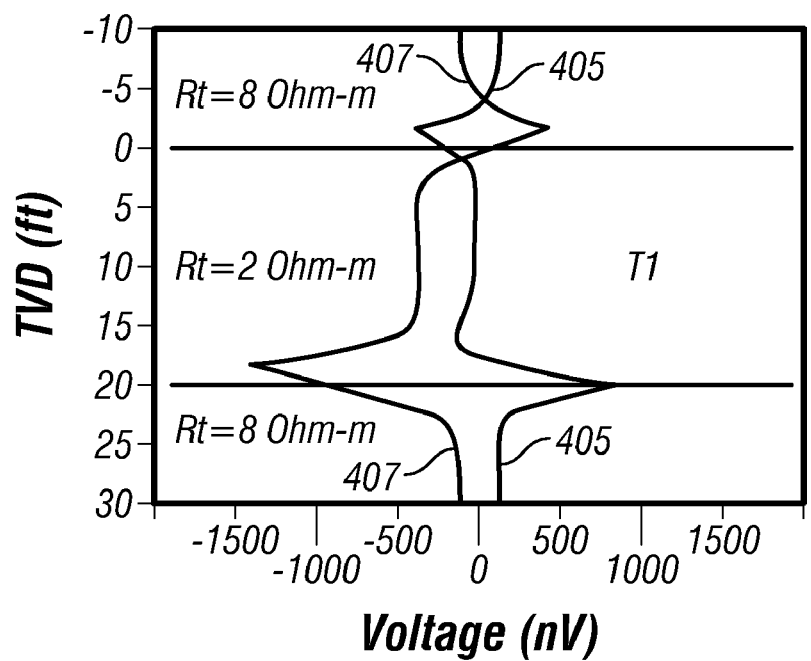

Turning now to FIGS. 7a, 7b, the in-phase 401 and quadrature 403 components of the $T_1$ response are shown for a borehole with a 60° inclination to the bed boundary. In FIG. 7a, the anisotropy factor is 1.0 while in FIG. 7b, the anisotropy factor is 2.0. The in-phase and quadrature components are shown by 405, 407 respectively. Several observations may be made about FIGS. 7a, 7b.

First, the "horns" of the curves are not at the bed boundary. More importantly, in FIG. 7a, the in-phase and quadrature components are both substantially zero at some distance away from the bed boundary. Since FIG. 7a is for an isotropic model, this shows that the cross-component response of the tool for an isotropic earth formation may be used as a distance indicator for reservoir navigation. The same is not true for FIG. 7b (anisotropic earth formation): even at some distance away from the bed boundaries, there are non-zero values for the in-phase and quadrature components. This means that in a deviated borehole, the response depends both on the distance to the bed boundary as well as on the anisotropy factor. The baseline is different from zero and is caused by anisotropy.

Figure 7C:
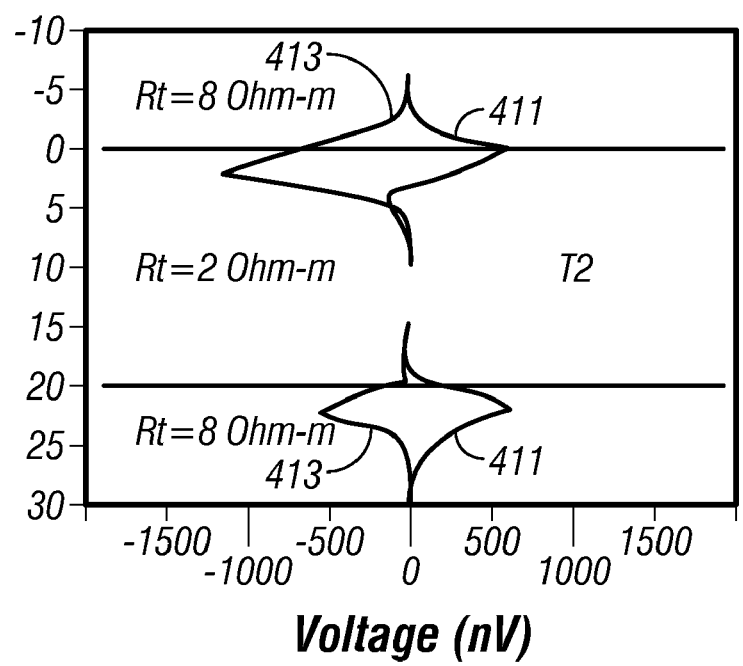
FIGS. 7C, 7D show the effect of anisotropy on the response of a single transmitter positioned on the opposite side of the transmitter of FIGS. 7a, 7b in a deviated borehole.
Figure 7D:
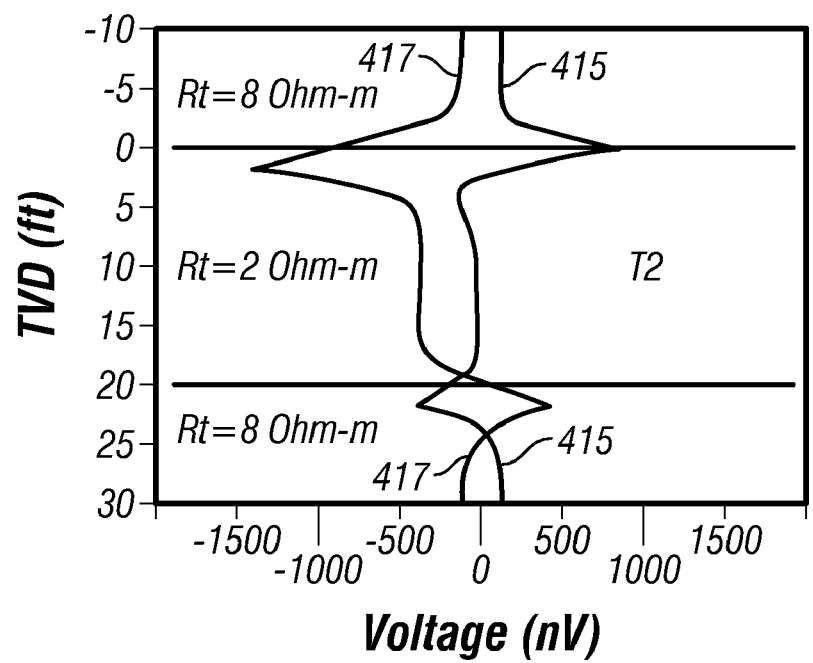
Figure 8A:
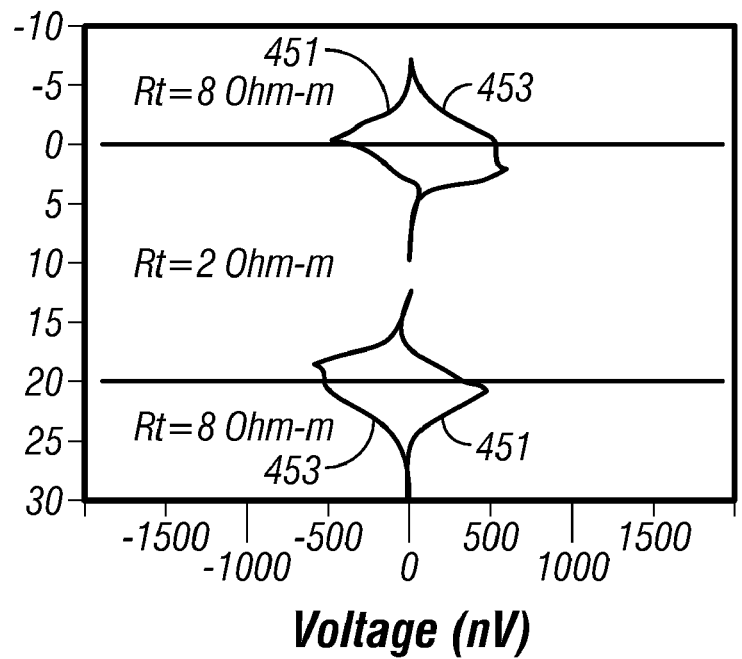
FIGS. 8A, 8B, 8C, 8D show the dual transmitter response in a deviated borehole for a number of different anisotropy factors.
Figure 8B:
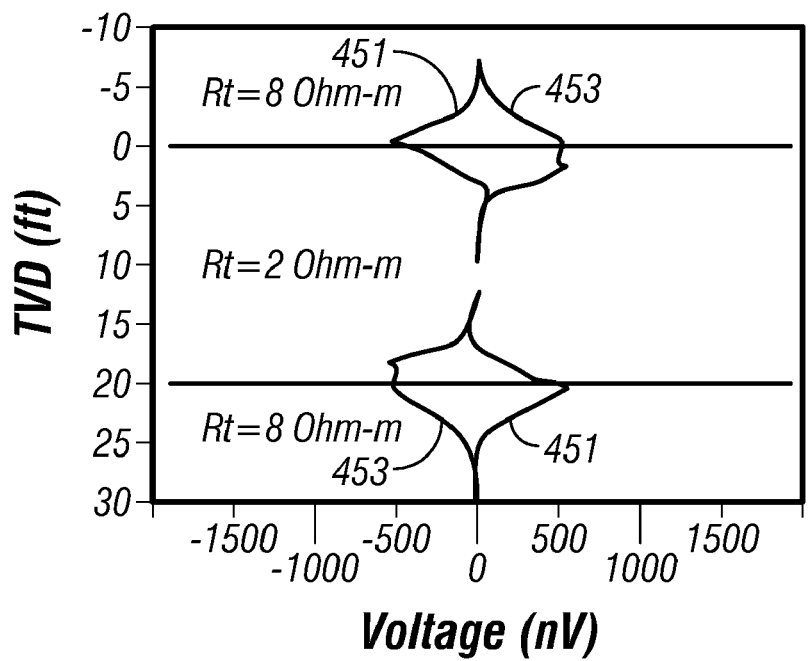
Figure 8C:
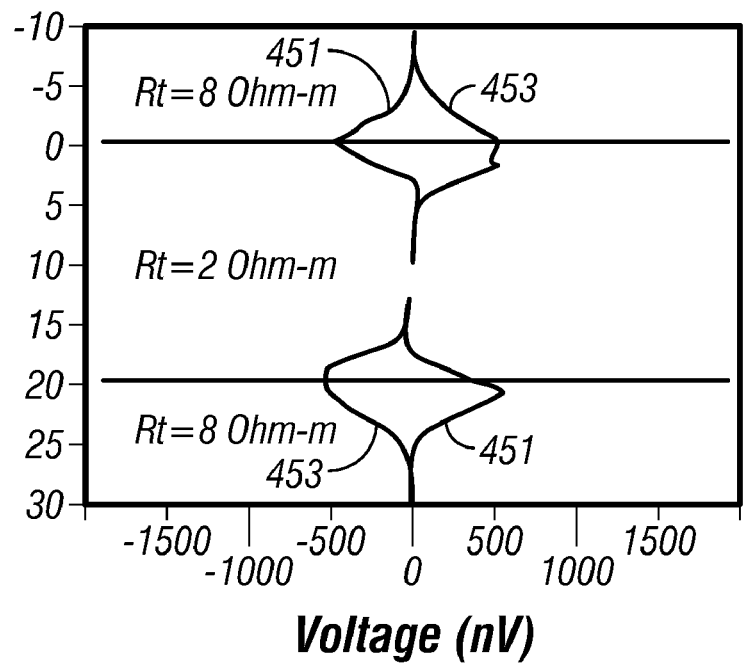
Figure 8D:
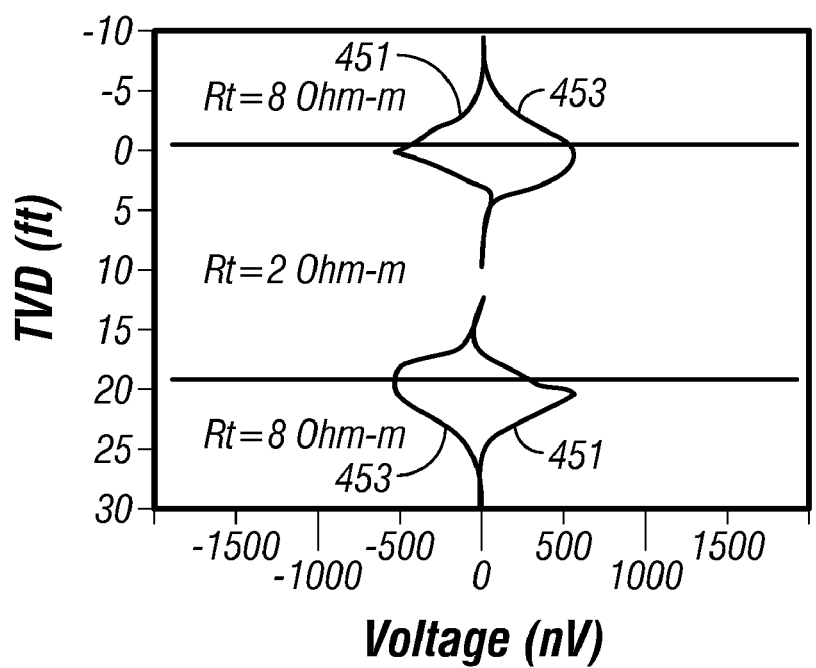
Figure 9A:
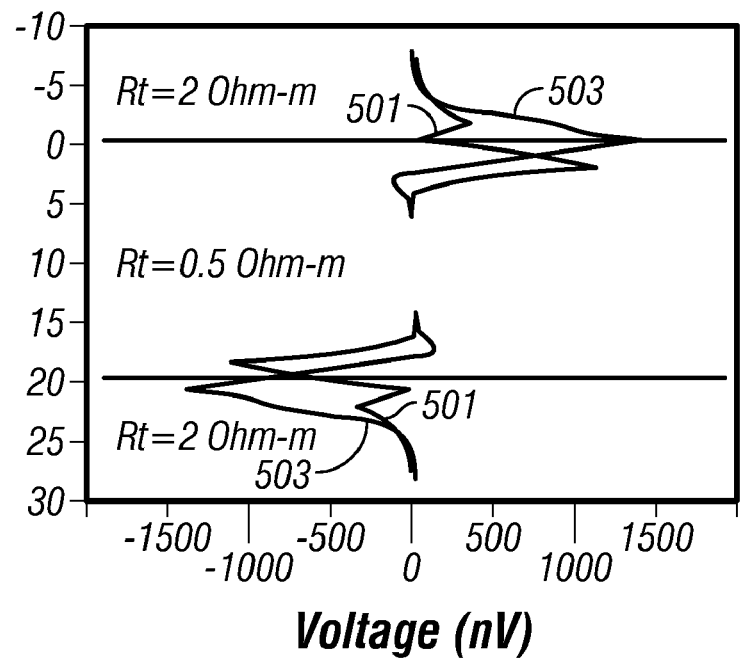
FIGS. 9A, 9B, 9C, 9D show the dual transmitter responses in a deviated borehole for a fixed anisotropy factor and a number of different resistivities.
Figure 9B:
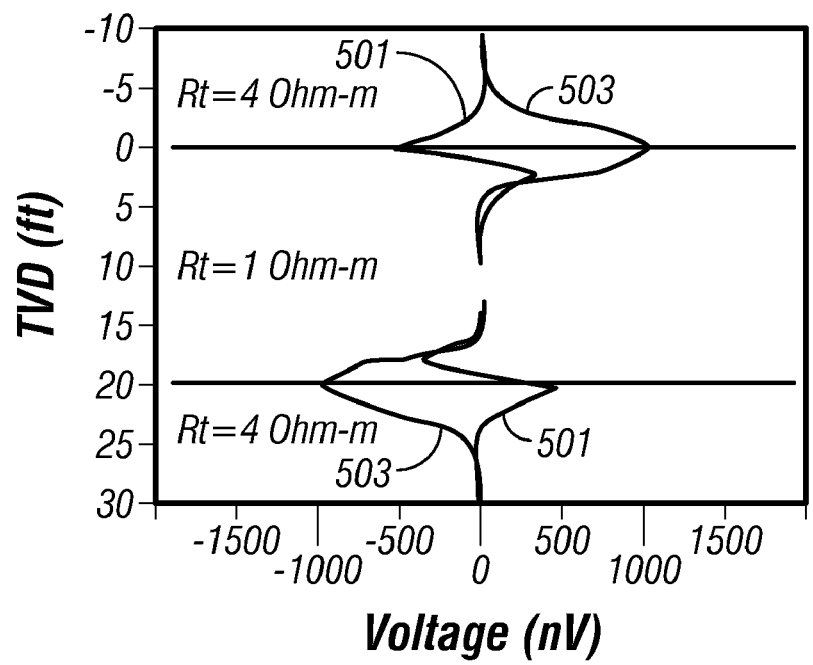
Figure 9C:
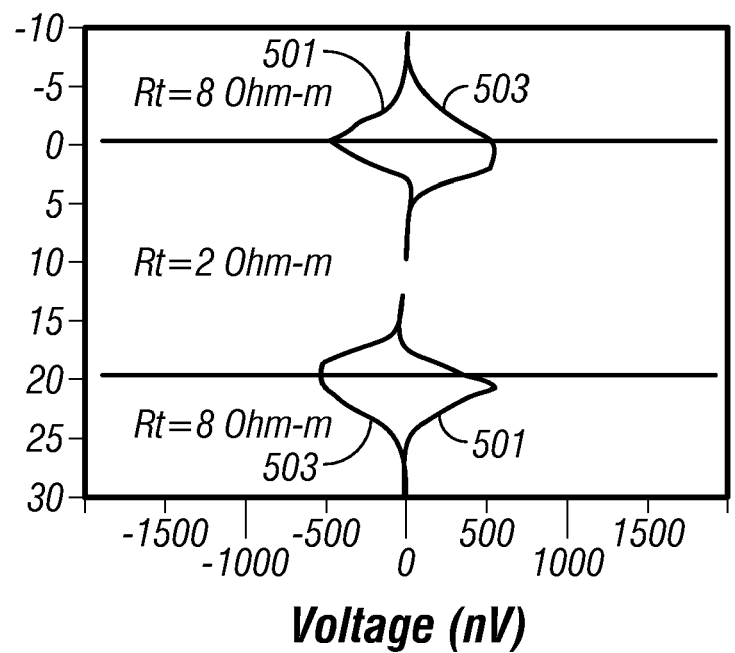
Figure 9D:
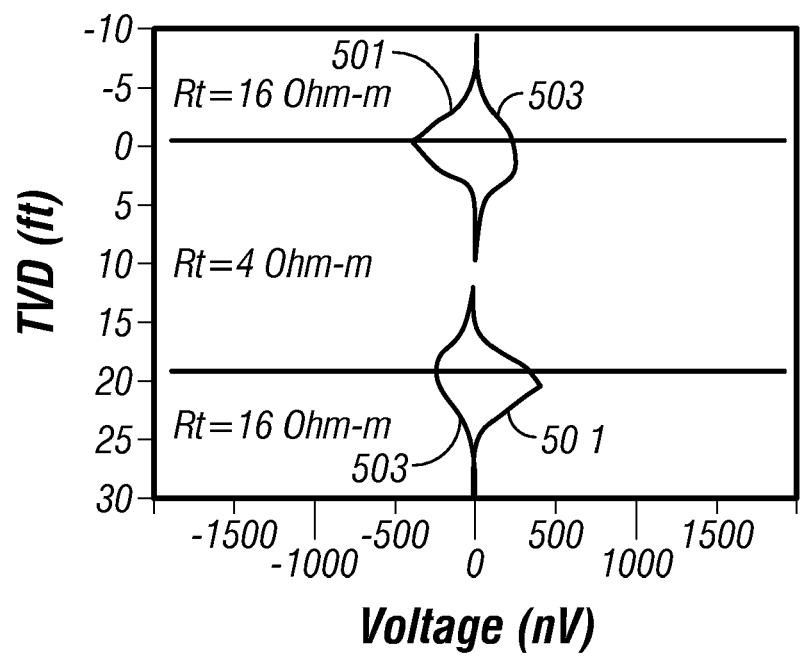

Similar conclusions follow from FIGS. 7c, 7d which are responses of the $T_2$ transmitter corresponding to FIGS. 7a, 7b. here, 411, 413 are the in-phase and quadrature components for isotropic formations while 415, 417 are the in-phase and quadrature components for the anisotropic formation. Additionally, comparison of FIG. 7a with 7c and of FIG. 7b with 7d shows that the offset of the "horns" from the bed boundaries are in opposite directions for the two transmitter signals, something that could have been expected as the nominal measuring point is midway between the two receivers. In addition, it is noted that the baseline response for the two transmitters has the same sign.

Based on these observations, in one embodiment of the present invention, the sign of the $T_2$ response is reversed and then added to the $T_1$ response. The results are shown in FIGS. 8a-8d for four different anisotropy factors: 1.0, 2.0, 3.0 and 4.0 respectively. The other model parameters are unchanged from FIGS. 7a-7d. In each of the figures, 451 is the in-phase component of the dual transmitter response while 453 is the quadrature component of the dual transmitter response.

To test the robustness of the method, additional examples are shown. In FIGS. 9a-9d, the anisotropy factor is fixed at 3.0, the resistivity contrast is fixed at 4.0, and the actual values of horizontal resistivities in the middle layer are 0.5 Ω-m, 1.0 Ω-m, 2.0 Ω-m and 4.0 Ω-m respectively. The quadrature component is particularly diagnostic of the position of the bed boundaries.

The invention has been described above with reference to a drilling assembly conveyed on a drillstring. However, the method and apparatus of the invention may also be used with a drilling assembly conveyed on coiled tubing. When the measurements are made with a sensor assembly mounted on a BHA during drilling operations, the determined distance can be used by a downhole processor to alter the direction of drilling of the borehole. Alternatively or additionally, the distance information may be telemetered to the surface where a surface processor or a drilling operator can control the drilling direction. The method may also be used in wireline applications to determine distances to bed boundaries away from the borehole. This may be useful in well completion, for example, in designing fracturing operations to avoid propagation of fractures beyond a specified distance.

It should further be noted that while the invention has been described with a dual transmitter, dual receiver configuration, the method of the invention is equally applicable with a dual transmitter single receiver arrangement. In such a situation, the raw signals in the single transmitter may be used (instead of the difference signal given by eqn. 1).

The processing of the data may be done by a downhole processor to give corrected measurements substantially in real time. Alternatively, the measurements could be recorded downhole, retrieved when the drillstring is tripped, and processed using a surface processor. Implicit in the control and processing of the data is the use of a computer program on a suitable machine readable medium that enables the processor to perform the control and processing. The machine readable medium may include ROMs, EAROMs, EPROMs, EEPROMs, Flash Memories and Optical disks.

The foregoing description is directed to particular embodiments of the present invention for the purpose of illustration and explanation it will be apparent, however, to one skilled in the art that many modifications and changes to the embodiments set forth above are possible without departing from the scope and the spirit of the invention. It is intended that the following claims be interpreted to embrace all such modifications and changes.

The scope of the invention may be better understood with reference to the following definitions:

anisotropic: exhibiting properties with different values when measured in different directions;

coil: one or more turns, possibly circular or cylindrical, of a current-carrying conductor capable of producing a magnetic field;

EAROM: electrically alterable ROM;

EEPROM: EEPROM is a special type of PROM that can be erased by exposing it to an electrical charge.

EPROM: erasable programmable ROM;

flash memory: a nonvolatile memory that is rewritable;
horizontal resistivity: resistivity in a direction normal to an axis of anisotropy usually in a direction parallel to a bedding plane of an earth formation;
induction: the induction of an electromotive force in a circuit by varying the magnetic flux linked with the circuit.
machine readable medium: something on which information may be stored in a form that can be understood by a computer or a processor;
Optical disk: a disc shaped medium in which optical methods are used for storing and retrieving information;
Principal cross-component: a signal obtained by excitation with a longitudinal transmitter coil in a transverse receiver coil or by excitation with a transverse transmitter coil in a longitudinal receiver coil;
Quadrature: 90° out of phase; and
ROM: Read-only memory.
vertical resistivity: resistivity in a direction parallel to an axis of anisotropy, usually in a direction normal to a bedding plane of an earth formation

What is claimed is:

1. A method of evaluating an anisotropic earth formation having an interface therein, the method comprising:
    (a) conveying a resistivity measuring instrument having at least one receiver coil into a borehole in the earth formation;
    (b) obtaining principal cross-component measurements at the at least one receiver resulting from excitation on opposite sides of the at least one receiver;
    (c) estimating from the principal cross-component measurements a distance to the interface, the estimation reducing an effect of the anisotropy of the earth formation.

2. The method of claim 1 wherein the principal cross-components comprise zx measurements.

3. The method of claim 1 wherein the resistivity measuring instrument comprises an induction instrument.

4. The method of claim 1 wherein obtaining the principal cross-component measurements further comprises exciting a pair of transmitter coils disposed on the resistivity measuring instrument on opposite sides of the at least one receiver coil.

5. The method of claim 1 wherein the at least one receiver comprises two receiver coils.

6. The method of claim 1 wherein estimating the distance further comprises at least one of (i) using a difference between in-phase components of the principal cross-components, and (ii) using a difference between quadrature components of the principal cross-components.

7. The method of claim 5 wherein estimating the distance further comprises determining, for each of the directions of excitation, a weighted difference between measurements made at each of the two receiver coils.

8. The method of claim 1 wherein the resistivity measuring instrument is part of a bottomhole assembly (BHA) conveyed on a drilling tubular, the method further comprising controlling a direction of drilling based on the determined distance.

9. An apparatus for evaluating an anisotropic earth formation having an interface therein, the apparatus comprising:
    (a) a resistivity measuring instrument having at least one receiver coil, the instrument configured to be conveyed into a borehole in the earth formation;
    (b) a pair of transmitter coils disposed on opposite sides of the at least one receiver coil, the at least one receiver coil configured to provide signals responsive to an excitation of each of the two transmitter coils; and
    (c) a processor which is configured to estimate from the signals a distance to the interface, the estimation reducing an effect on the signals of the anisotropy of the earth formation.

10. The apparatus of claim 9 wherein the signals comprise principal cross-component measurements.

11. The apparatus of claim 10 wherein the principal cross-components comprise zx measurements.

12. The apparatus of claim 9 wherein the resistivity measuring instrument comprises an induction instrument.

13. The apparatus of claim 9 wherein the processor is configured to estimate the distance based at least in part on performing a coordinate transformation of the signals.

14. The apparatus of claim 9 wherein the at least one receiver coil comprises two receiver coils.

15. The apparatus of claim 9 wherein the processor is configured to estimate the distance by further using at least one of (i) a difference between in-phase components of principal cross-components of the signals, and (ii) a difference between quadrature components of principal cross-components of the signals.

16. The apparatus of claim 14 wherein the processor is configured to estimate the distance by further determining, for each of the directions of excitation, a weighted difference between measurements made at each of the two receiver coils.

17. The apparatus of claim 9 wherein the resistivity measuring instrument is part of a bottomhole assembly (BHA) configured to be conveyed on a drilling tubular, and wherein the processor is further configured to control a direction of drilling based on the determined distance.

18. A computer readable medium for use with an apparatus configured to evaluate an anisotropic earth formation having an interface therein, the apparatus comprising:
    (a) a resistivity measuring instrument having at least one receiver coil, the instrument configured to be conveyed into a borehole in the earth formation; and
    (b) a pair of transmitter coils disposed on opposite sides of the at least one receiver coil, the at least one receiver coil configured to provide signals responsive to an excitation of each of the two transmitter coils;
the medium comprising instructions which are executable to enable:
    (c) a processor to estimate from the signals a distance to the interface, the estimation reducing an effect on the signals of the anisotropy of the earth formation.

19. The medium of claim 18 further comprising instructions which are executable to enable a processor to control a direction of drilling of a bottomhole assembly carrying the resistivity measuring instrument.

20. The medium of claim 18 wherein the processor is on a bottomhole assembly carrying the resistivity measuring instrument.

21. The medium of claim 18 further comprising at least one of (i) a ROM, (ii) an EAROM, (iii) an EPROM, (iv) an EEPROM, (v) a flash memory, and (vi) an optical disk.

* * * * *

UNITED STATES PATENT AND TRADEMARK OFFICE
CERTIFICATE OF CORRECTION

PATENT NO. : 7,471,088 B2
APPLICATION NO. : 11/298255
DATED : December 30, 2008
INVENTOR(S) : Liming Yu, Tsili Wang and Jack Signorello It is certified that error appears in the above-identified patent and that said Letters Patent is hereby corrected as shown below:

Column 9, claim 1(b), line 28, delete "receiver resulting", insert --receiver coil resulting--;

Column 9, claim 1(b), line 29, delete "one receiver,", insert --one receiver coil,--;

Column 9, claim 5, line 42, delete "one receiver", insert --one receiver coil--;

Column 9, claim 8, line 56, delete "determined", insert --estimated--;

Column 10, claim 17, line 34, delete "determined", insert --estimated--; and

Column 10, claim 19, line 51, delete "a processor", insert --the processor--.

Signed and Sealed this

Seventeenth Day of March, 2009

JOHN DOLL
*Acting Director of the United States Patent and Trademark Office*